US011180104B2

(12) United States Patent
Hioda

(10) Patent No.: US 11,180,104 B2
(45) Date of Patent: Nov. 23, 2021

(54) AIRBAG DEVICE

(71) Applicant: Toyota Jidosha Kabushiki Kaisha, Toyota (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 16/680,985

(22) Filed: Nov. 12, 2019

(65) Prior Publication Data

US 2020/0148152 A1    May 14, 2020

(30) Foreign Application Priority Data

Nov. 14, 2018 (JP) .............................. JP2018-213646

(51) Int. Cl.
| | |
|---|---|
| *B60R 21/205* | (2011.01) |
| *B60R 21/264* | (2006.01) |
| *B60R 21/2155* | (2011.01) |
| *B60R 21/2342* | (2011.01) |
| *B60R 21/00* | (2006.01) |
| *B60R 21/215* | (2011.01) |

(52) U.S. Cl.
CPC ........ *B60R 21/205* (2013.01); *B60R 21/2155* (2013.01); *B60R 21/2342* (2013.01); *B60R 21/264* (2013.01); *B60R 2021/0004* (2013.01); *B60R 2021/0009* (2013.01); *B60R 2021/0048* (2013.01); *B60R 2021/21537* (2013.01)

(58) Field of Classification Search
CPC . B60R 21/205; B60R 21/264; B60R 21/2155; B60R 21/2342; B60R 2021/0004; B60R 2021/21537; B60R 2021/0048; B60R 2021/0009; B60R 21/2165; B60R 21/26; B60R 21/231
See application file for complete search history.

(56) References Cited

U.S. PATENT DOCUMENTS

| | | | |
|---|---|---|---|
| 5,072,966 A * | 12/1991 | Nishitake | .......... B60R 21/23138 280/730.2 |
| 5,529,337 A | 6/1996 | Takeda et al. | |
| 2005/0121889 A1* | 6/2005 | Enders | ................ B60R 21/2035 280/731 |
| 2006/0006631 A1 | 1/2006 | Meissner et al. | |

(Continued)

FOREIGN PATENT DOCUMENTS

| | | |
|---|---|---|
| JP | H07156740 A | 6/1995 |
| JP | 2006-508862 A | 3/2006 |
| JP | 2016-040155 A | 3/2016 |

*Primary Examiner* — Drew J Brown
(74) *Attorney, Agent, or Firm* — Dinsmore & Shohl LLP

(57) ABSTRACT

An airbag device includes: an airbag that is provided on a vehicle front side of a front passenger seat provided in a cabin, inflates as a result of a gas being supplied to the inside of the airbag, and deploys on the vehicle front side of an occupant seated in the front passenger seat; an airbag housing that is provided on the vehicle front side of the front passenger seat and in which is housed the airbag before inflating; and an airbag door that covers the airbag housing from the cabin side and becomes displaced toward the cabin side when the airbag inflates, whereby the airbag door opens the cabin side of the airbag housing. Movement of the airbag in the vehicle width direction after complete deployment is limited by at least part of the airbag door.

20 Claims, 8 Drawing Sheets

(56) References Cited

U.S. PATENT DOCUMENTS

| | | | |
|---|---|---|---|
| 2008/0211209 A1* | 9/2008 | Evans | B60R 21/2165 |
| | | | 280/728.3 |
| 2014/0265269 A1* | 9/2014 | Fischer | B60R 21/205 |
| | | | 280/730.1 |
| 2016/0046257 A1 | 2/2016 | Yamada et al. | |
| 2019/0161049 A1* | 5/2019 | Thomas | B60R 21/215 |
| 2020/0180544 A1* | 6/2020 | Ohara | B60R 21/215 |
| 2020/0406852 A1* | 12/2020 | Fischer | B60R 21/26 |

* cited by examiner

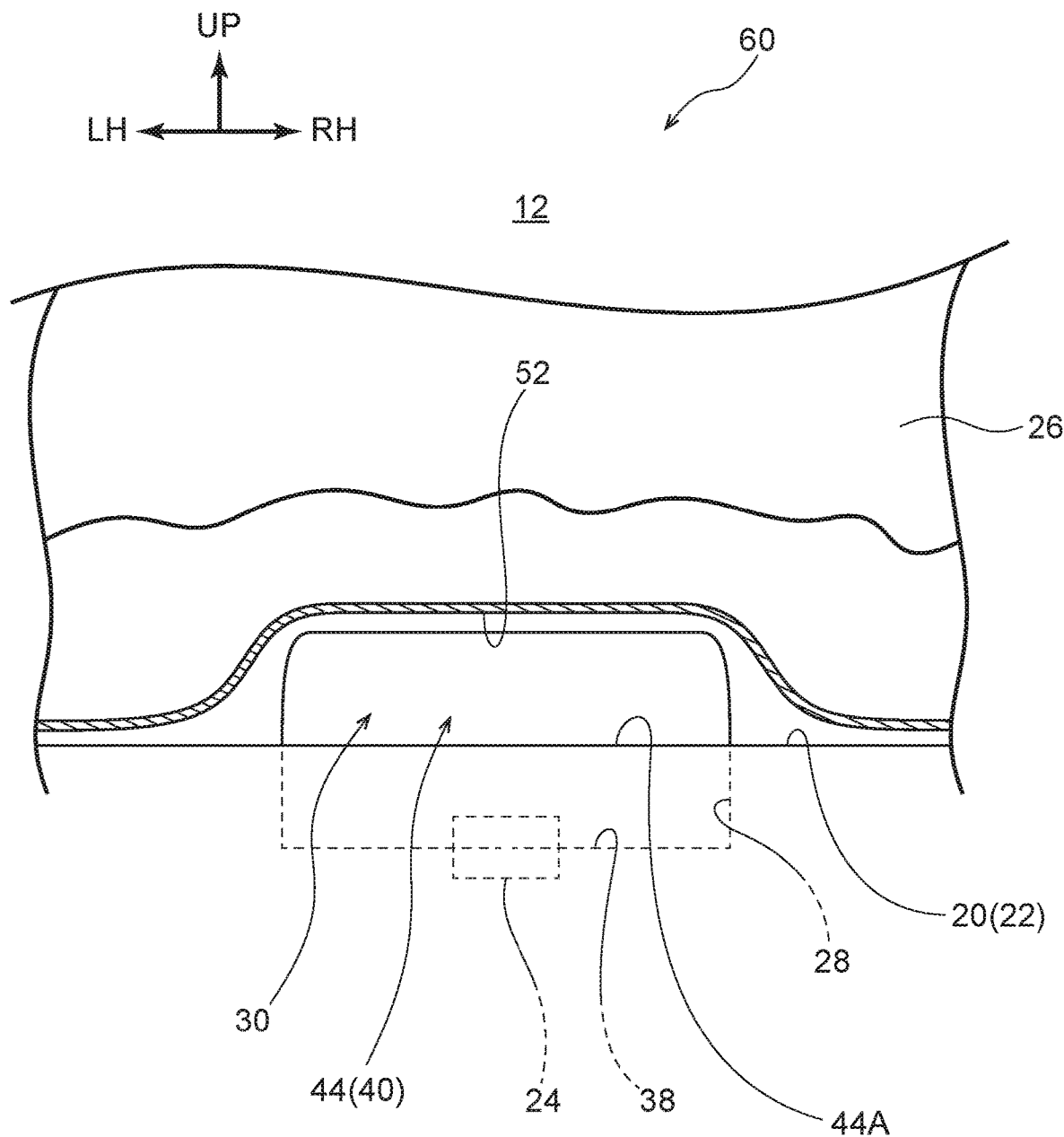

AIRBAG DEVICE

CROSS-REFERENCE TO RELATED APPLICATION

This application is based on and claims priority under 35 USC 119 from Japanese Patent Application No. 2018-213646, filed on Nov. 14, 2018, the disclosure of which is incorporated by reference herein.

BACKGROUND

Technical Field

The present disclosure relates to an airbag device.

Related Art

Japanese Patent Application Laid-open (JP-A) No. 2016-40155 (patent document 1) discloses an airbag device (a front passenger seat airbag device) equipped with an airbag that deploys and inflates from a housing at the time of a frontal impact to a vehicle to restrain an occupant seated in a front passenger seat. The airbag that configures part of the airbag device described in this document is equipped with a main bag portion, which inflates in front of the occupant seated in the front passenger seat, and a center bag portion, which inflates so as to project from the main bag portion inward (toward the driver's seat) in the vehicle width direction of the vehicle and is disposed in front of the region between the front passenger seat and the driver's seat. Provided between the center bag portion and the housing is an outer tether that interconnects both.

In the airbag device described in this document, the center bag portion is connected via the outer tether to the housing in a state after the complete inflation of the airbag. For that reason, when the center bag portion projects from the housing, the center bag portion can be inhibited from projecting a great extent in an oblique rearward direction from the housing, and additionally the outer tether can regulate vehicle width direction spreading of the portion on the front end side of the center bag portion. Because of this, swinging during the inflation of the center bag portion is inhibited, and it becomes possible to quickly inflate the airbag to its completely inflated shape.

SUMMARY

In this connection, if the vehicle sustains an oblique impact (an impact from an oblique frontal direction with respect to the front portion of the vehicle) or the like, it is conceivable for the head of the occupant seated in the front passenger seat or the like to come into abutting contact with the airbag while moving in an oblique forward direction of the vehicle and push the airbag in an oblique forward direction of the vehicle. In this case, being able to inhibit movement of the airbag in the vehicle width direction is desirable from the standpoint of ensuring the ability of the airbag to restrain the head of the occupant, but the configuration described in patent document 1 does not take such a case into consideration.

In consideration of the circumstances described above, it is an object of the present disclosure to obtain an airbag device that can inhibit the airbag from moving in the vehicle width direction when the airbag is pushed by the head of an occupant moving in an oblique forward direction of the vehicle.

An airbag device of a first aspect of the disclosure includes: an airbag that is provided at a vehicle front side of a vehicle seat provided in a cabin, that inflates as a result of a gas being supplied to an interior of the airbag, and that deploys to a vehicle front side of an occupant seated in the vehicle seat; an airbag housing that is provided at the vehicle front side of the vehicle seat and in which the airbag is housed before inflating; and an airbag door that covers the airbag housing from a cabin side and that displaces toward the cabin side in a case in which the airbag inflates, whereby the airbag door opens the cabin side of the airbag housing, wherein movement of the airbag in a vehicle width direction after complete deployment is limited by at least part of the airbag door.

According to the airbag device of the first aspect, when the airbag inflates as a result of the gas being supplied to the inside of the airbag, the airbag door becomes displaced toward the cabin side. Because of this, the cabin side of the airbag housing is opened and the airbag deploys from the airbag housing to the vehicle front side of the occupant seated in the vehicle seat. Here, in a state after complete deployment of the airbag, movement of the airbag in the vehicle width direction is regulated by at least part of the airbag door. For that reason, when the airbag is pushed by the head of the occupant moving in an oblique forward direction of the vehicle at the time of a frontal impact to the vehicle, the airbag can be inhibited from moving in the vehicle width direction.

An airbag device of a second aspect is the airbag device of the first aspect, wherein the airbag is equipped with a main body portion that is cuboidal in shape in a completely deployed state and a center bag portion that projects rearward from a rear end portion, on the vehicle width direction center side, of the main body portion.

According to the airbag device of the second aspect, the airbag is equipped with the center bag portion that projects rearward from the rear end portion, on the vehicle width direction center side, of the main body portion that is cuboidal in shape in a completely deployed state; therefore, when the head of the occupant seated in the vehicle seat moves in an oblique forward direction of the vehicle at the time of a frontal impact to the vehicle, the head of the occupant pushes the center bag portion. For that reason, the head of the occupant can be inhibited from moving in the oblique forward direction of the vehicle.

An airbag device of a third aspect is the airbag device of the first aspect or the second aspect, wherein the airbag door includes plural door portions that tilt about hinge portions at parts of the airbag housing along an open end of the airbag housing, the rigidities of the hinge portions make it more difficult for the door portions that tilt about the hinge portions at the vehicle width direction end portions of the airbag housing to tilt, than for the door portions that tilt about the hinge portions at a vehicle front side and a vehicle rear side of the airbag housing to tilt, and movement of the airbag in the vehicle width direction after complete deployment is limited by the door portions that tilt about the hinge portions at the vehicle width direction end portions of the airbag housing.

According to the airbag device of the third aspect, when the airbag inflates as a result of the gas being supplied to the inside of the airbag, the door portions that configure the airbag door tilt about their respective hinge portions. Because of this, the cabin side of the airbag housing is opened and the airbag deploys from the airbag housing to the vehicle front side of the occupant seated in the vehicle seat. Here, the rigidities of the hinge portions are set so that it is more difficult for the door portions that tilt about the hinge portions at the vehicle width direction end portions of the airbag housing to tilt than it is for the door portions that tilt about the hinge portions at the vehicle front side and the vehicle rear side of the airbag housing. Because of this, movement of the airbag in the vehicle width direction after complete deployment can be effectively inhibited by the door portions whose hinge portions are on the vehicle width direction end portions of the airbag housing. Furthermore, when the airbag inflates, the door portions whose hinge portions are on the vehicle front side and the vehicle rear side of the airbag housing can be quickly tilted.

An airbag device of a fourth aspect is the airbag device of the third aspect, wherein the rigidities of the hinge portions make it more difficult for a door portion that tilts about the hinge portion at a vehicle width direction inner side of the airbag housing to tilt, than for a door portion that tilts about the hinge portion at a vehicle width direction outer side of the airbag housing to tilt.

According to the airbag device of the fourth aspect, it is more difficult for the door portion that tilts about the hinge portion at the vehicle width direction inner side of the airbag housing to tilt than it is for the door portion that tilts about the hinge portion at the vehicle width direction outer side of the airbag housing. Because of this, movement of the airbag inward in the vehicle width direction after complete deployment can be effectively inhibited.

An airbag device of a fifth aspect is the airbag device of the first aspect or the second aspect, wherein the airbag door includes plural door portions that tilt about hinge portions at parts of the airbag housing along an open end of the airbag housing, and movement of the airbag in the vehicle width direction after complete deployment is limited by the door portion that tilts about a hinge portion at a vehicle rear side of the airbag housing.

According to the airbag device of the fifth aspect, movement of the airbag in the vehicle width direction after complete deployment can be inhibited by the door portion that tilts about the hinge portion on the vehicle rear side of the airbag housing.

An airbag device of a sixth aspect is the airbag device of any one of the first aspect to the fifth aspect, wherein a recess by which movement of the airbag in the vehicle width direction after complete deployment is limited as a result of part of the airbag door becoming disposed inside the recess is formed in the airbag after complete deployment.

According to the airbag device of the sixth aspect, in a state in which deployment of the airbag is complete, part of the airbag is disposed inside the recess of the airbag. Because of this, movement of the airbag in the vehicle width direction after complete deployment can be inhibited.

An airbag device of a seventh aspect is the airbag device of the sixth aspect, wherein the airbag includes a seam that forms the recess.

According to the airbag device of the seventh aspect, by appropriately setting the configuration of the seam, the recess, inside of which part of the airbag becomes disposed, can be easily formed in the airbag.

An airbag device of an eighth aspect is the airbag device of any one of the first aspect to the fifth aspect, wherein an engagement member by which movement of the airbag in the vehicle width direction after complete deployment is limited as a result of part of the airbag door becoming engaged with the engagement member, is attached to the airbag.

According to the airbag device of the eighth aspect, in a state in which deployment of the airbag is complete, part of the airbag is engaged with the engagement member attached to the airbag. Because of this, movement of the airbag in the vehicle width direction after complete deployment can be inhibited.

The airbag device pertaining to the disclosure has the superior effect of being able to inhibit the airbag from moving in the vehicle width direction when the airbag is pushed by the head of an occupant moving in an oblique forward direction of the vehicle.

BRIEF DESCRIPTION OF THE DRAWINGS

Embodiments will be described in detail based on the following figures, wherein:

FIG. 8 is a partial sectional view, seen from a front passenger seat side, of an airbag device pertaining to a fourth embodiment.

DETAILED DESCRIPTION

First Embodiment

Figure 1:
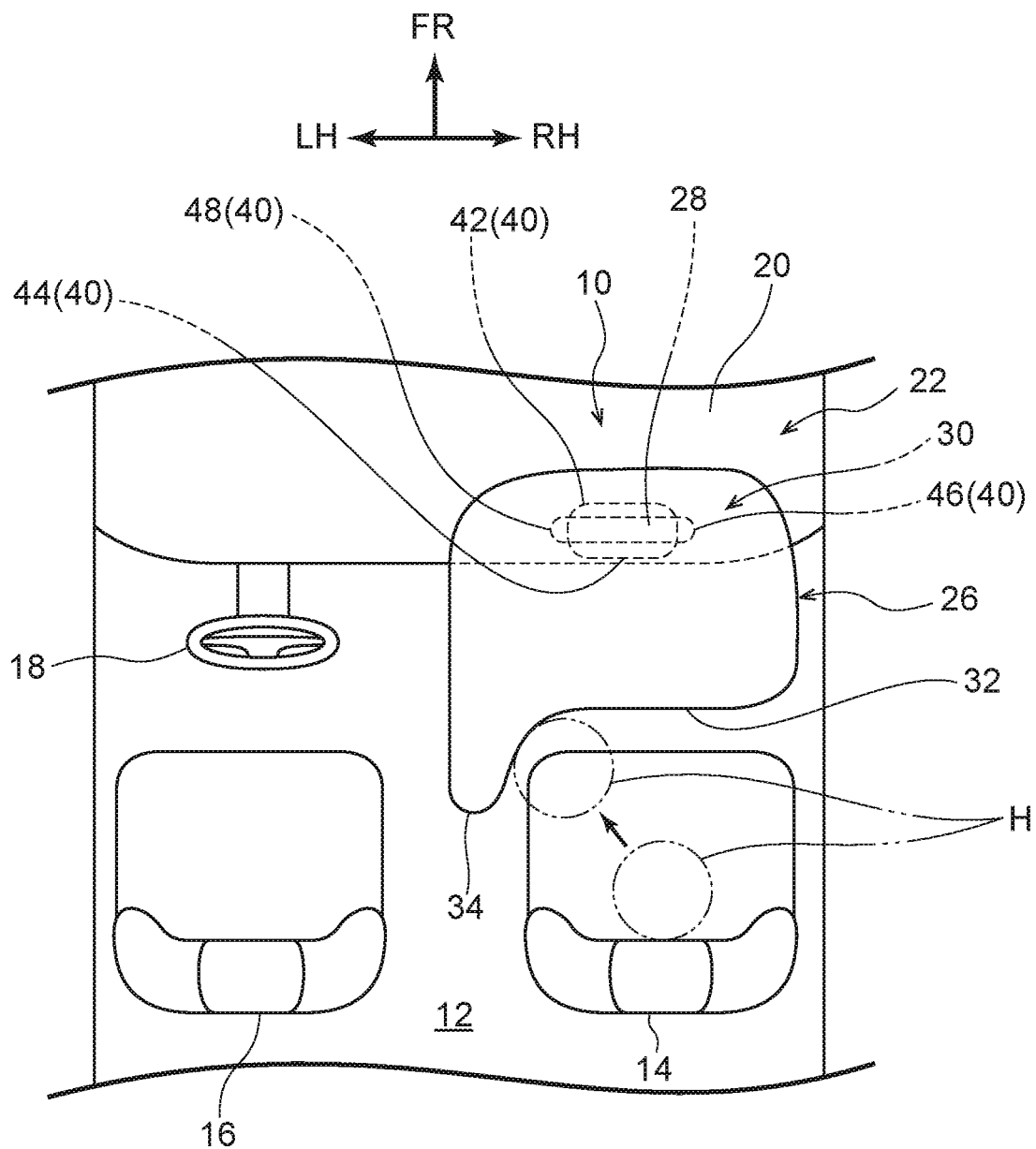
FIG. 1 is a plan view, seen from above, of a cabin of a vehicle equipped with an airbag device of a first embodiment.

An airbag device 10 pertaining to a first embodiment of the disclosure will be described using FIG. 1 to FIG. 3. Arrow FR appropriately shown in the drawings indicates a forward direction in a vehicle front and rear direction, arrow UP indicates an upward direction in a vehicle up and down direction, arrow RH indicates a rightward direction in a vehicle width direction, and arrow LH indicates a leftward direction in the vehicle width direction. Below, when description is given simply using the directions of front/rear, right/left, and upper/lower, unless otherwise specified these will be understood to mean front/rear in the vehicle front and rear direction, right/left in the vehicle right and left direction (the vehicle width direction), and upper/lower in the vehicle up and down direction.

As shown in FIG. 1, the airbag device 10 of the present embodiment is provided on the front side of a front passenger seat 14 serving as a vehicle seat provided on the right side of a cabin 12. A driver's seat 16 is provided on the left side of the front passenger seat 14 in the cabin 12. The vehicle travels as a result of a steering wheel 18 or the like being operated by an occupant seated in the driver's seat 16.

An instrument panel 22 having a top panel portion 20 that extends in the front and rear direction and the vehicle width direction is provided on the front side of the front passenger seat 14 and the driver's seat 16. The airbag device 10 of the present embodiment, which restrains an occupant seated in the front passenger seat 14 at the time of a frontal impact to the vehicle, is provided in the instrument panel 22.

Figure 2:
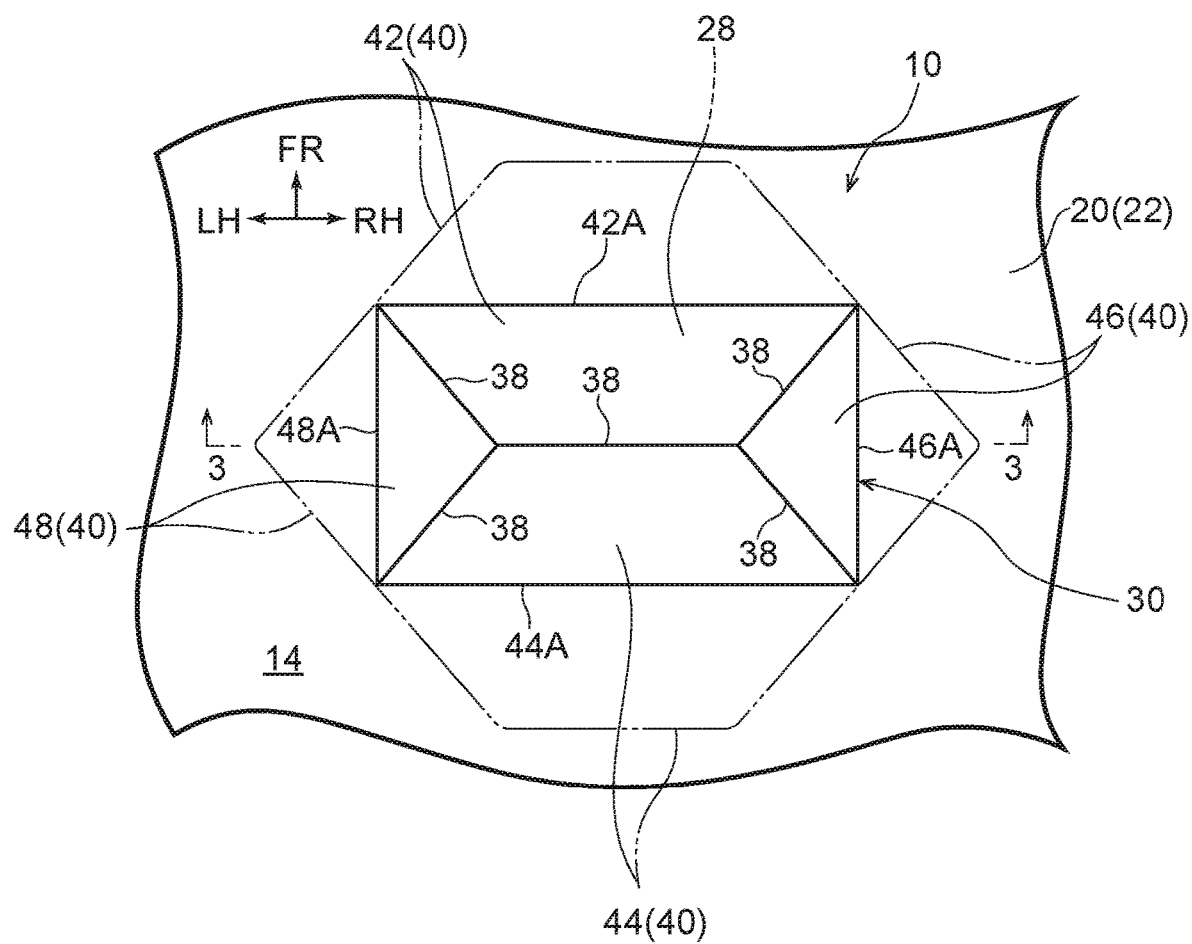
FIG. 2 is a plan view showing an airbag door.
Figure 3:
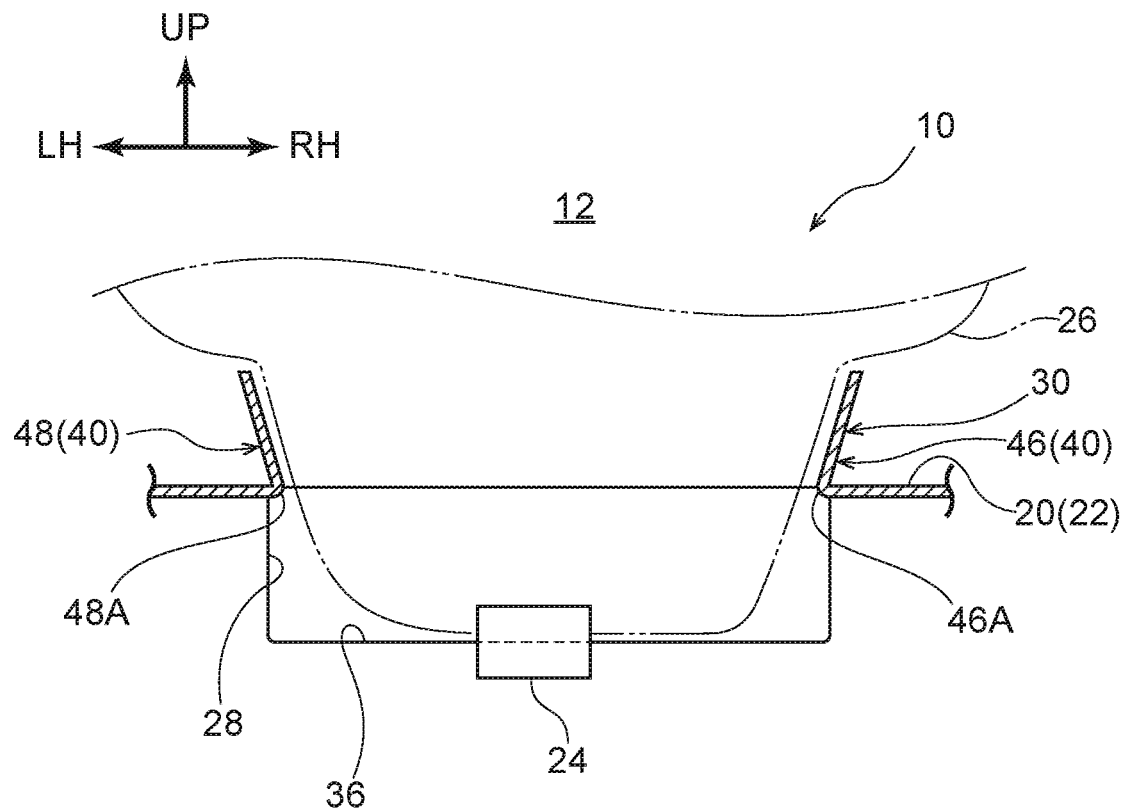
FIG. 3 is a sectional view showing the airbag device cut along line 3-3 shown in FIG. 2, and shows a state in which an airbag has deployed.

As shown in FIG. 3, the airbag device 10 is equipped with an inflator 24, which generates a gas, and an airbag 26, which inflates as a result of the gas generated by the inflator 24 being supplied to the inside of the airbag 26. The airbag device 10 is also equipped with an airbag housing (airbag case) 28, to which the inflator 24 is secured and in which the airbag 26 before inflating is housed in a folded-up state, and an airbag door 30 (see also FIG. 2), which closes an open end on the cabin 12 side of the airbag housing 28.

As shown in FIG. 1, the airbag 26 is formed into a bag as a result of a cloth-like member being woven or a cloth-like member being joined by sewing or the like. The airbag 26 is equipped with a main body portion 32, which is cuboidal in shape and deploys to the front side of the front passenger seat 14, and a center bag portion 34, which projects in the rearward direction from the end portion on the left side (the vehicle width direction center side) of the main body portion 32. In a state after complete deployment of the airbag 26, the center bag portion 34 is disposed between the front passenger seat 14 and the driver's seat 16.

As shown in FIG. 3, the airbag housing 28 is provided in the instrument panel 22 and is formed in the shape of a bottomed box whose cabin 12 side is open. The inflator 24 that supplies the gas to the airbag 26 is secured via fastening members or the like to a bottom 36 of the airbag housing 28.

As shown in FIG. 2, the airbag door 30 is formed in the shape of a rectangular panel corresponding to the shape of the open end of the airbag housing 28 (see FIG. 2). The airbag door 30 is configured to rupture at tear lines 38 at which the airbag door 30 is thinner-walled than at other portions. When the airbag door 30 ruptures at the tear lines 38, the airbag door 30 becomes divided into four door portions 40. The four door portions 40 tilt (become displaced) toward the cabin 12 side as a result of being pushed by the inflated airbag 26. In FIG. 2, the solid lines indicate a state before the airbag door 30 becomes divided into the four door portions 40 (a state before the airbag door 30 ruptures at the tear lines 38), and the long dashed double-short dashed lines indicate a state in which the four door portions 40 have been pushed by the inflated airbag 26 and tilted.

The door portion 40 on the front side out of the four door portions 40 is a front-side door portion 42 that tilts in the forward direction about a hinge portion 42A on the front-side edge of the open end of the airbag housing 28. The front-side door portion 42 is formed in the shape of an isosceles trapezoid whose bottom base is the hinge portion 42A.

The door portion 40 on the rear side out of the four door portions 40 is a rear-side door portion 44 that tilts in the rearward direction about a hinge portion 44A on the rear-side edge of the open end of the airbag housing 28. The rear-side door portion 44 is formed in the shape of an isosceles trapezoid whose bottom base is the hinge portion 44A. The front-side door portion 42 and the rear-side door portion 44 are configured to be symmetrical in the front and rear direction.

The door portion 40 on the right side out of the four door portions 40 is a right-side door portion 46 that tilts in the rightward direction about a hinge portion 46A on the right-side edge of the open end of the airbag housing 28. The right-side door portion 46 is formed in the shape of an isosceles triangle whose base is the hinge portion 46A.

The door portion 40 on the left side out of the four door portions 40 is a left-side door portion 48 that tilts in the leftward direction about a hinge portion 48A on the left-side edge of the open end of the airbag housing 28. The left-side door portion 48 is formed in the shape of an isosceles triangle whose base is the hinge portion 48A. The right-side door portion 46 and the left-side door portion 48 are configured to be symmetrical in the right and left direction.

Here, in the present embodiment, the rigidities (flexural rigidities) of the hinge portions 42A, 44A, 46A, 48A are adjusted so that when the door portions 40 are pushed by the airbag 26 it is more difficult for the right-side door portion 46 and the left-side door portion 48 to tilt than it is for the front-side door portion 42 and the rear-side door portion 44. The rigidities of the hinge portions 42A, 44A, 46A, 48A are adjusted by the thicknesses and/or the sectional shapes of the hinge portions 42A, 44A, 46A, 48A. In addition to this, in the present embodiment, the rigidities of the hinge portions 46A, 48A are adjusted so that it is more difficult for the left-side door portion 48 to tilt than it is for the right-side door portion 46. As shown in FIG. 3, movement of the airbag 26 in the vehicle width direction (the right and left direction) after deployment is limited by the left-side door portion 48 and the right-side door portion 46. Namely, the left-side door portion 48 and the right-side door portion 46 project with angles between themselves and the instrument panel 22 after the deployment of the airbag 26, whereby they limit movement of the airbag 26 in the vehicle width direction (the right and left direction) at the base end portion of the airbag 26.

Action and Effects of Present Embodiment

Next, the action and effects of the present embodiment will be described.

As shown in FIG. 1, FIG. 2, and FIG. 3, when the vehicle equipped with the airbag device 10 of the present embodiment sustains a frontal impact, the inflator 24 generates the gas. Here, a "frontal impact" refers to a full overlap impact, an offset impact, a small overlap impact, or an oblique impact.

The gas generated by the inflator 24 is supplied to the inside of the airbag 26 housed in a folded-up state in the airbag housing 28. Because of this, the airbag 26 starts to inflate, and the airbag 26 pushes the airbag door 30 toward the cabin 12 side As a result, the airbag door 30 ruptures at the tear lines 38, and the front-side door portion 42, the rear-side door portion 44, the right-side door portion 46, and the left-side door portion 48 that configure the airbag door 30 tilt about their respective hinge portions 42A, 44A, 46A, 48A. Because of this, the cabin 12 side of the airbag housing 28 is opened and, as shown in FIG. 1, the airbag 26 deploys from the airbag housing 28 to the vehicle front side of the occupant seated in the front passenger seat 14.

In this connection, if the vehicle sustains an oblique impact to the driver's seat side, there are cases where the head H of the occupant seated in the front passenger seat 14 moves in an oblique forward direction of the vehicle as indicated by the long dashed double-short dashed lines in FIG. 1. As an example, there are cases where the head H of the occupant seated in the front passenger seat 14 moves in the forward direction while moving inward (leftward) in the vehicle width direction. In this case, the head H of the occupant seated in the front passenger seat 14 pushes the center bag portion 34 of the airbag 26 leftward. Here, in the present embodiment, as shown in FIG. 3, movement of the airbag 26 leftward after deployment is limited by the left-side door portion 48. Because of this, when the head H of the occupant seated in the front passenger seat 14 pushes the center bag portion 34 of the airbag 26 leftward, the airbag 26 can be inhibited from moving leftward. That is, at the time of an oblique impact to the driver's seat side, movement of the airbag 26 toward the vehicle width direction center side is inhibited mainly by the left-side door portion 48. Furthermore, at the time of an oblique impact to the front passenger seat side, movement of the airbag 26 outward in the vehicle width direction is inhibited mainly by the right-side door portion 46.

Furthermore, in the present embodiment, the rigidities of the hinge portions 46A, 48A are adjusted so that it is more difficult for the left-side door portion 48 to tilt than it is for the right-side door portion 46. Because of this, movement of the airbag 26 leftward (toward the driver's seat 16 side) after complete deployment can be effectively inhibited.

Moreover, in the present embodiment, the rigidities of the hinge portions 42A, 44A, 46A, 48A are adjusted so that it is more difficult for the right-side door portion 46 and the left-side door portion 48 to tilt than it is for the front-side door portion 42 and the rear-side door portion 44. Because of this, movement of the airbag 26 toward the vehicle width direction center side at the time of an oblique impact to the driver's seat side can be inhibited by the left-side door portion 48. Moreover, movement of the airbag 26 outward in the vehicle width direction at the time of an oblique impact to the front passenger seat side can be inhibited by the right-side door portion 48. Furthermore, when the door portions 40 are pushed by the airbag 26, the front-side door portion 42 and the rear-side door portion 44 can be tilted more quickly than the left-side door portion 48 and the right-side door portion 46.

Second Embodiment

An airbag device 50 pertaining to a second embodiment of the disclosure will be described using FIG. 4 and FIG. 5. Members and parts of the airbag device 50 pertaining to the second embodiment that correspond to those of the airbag device 10 pertaining to the first embodiment are assigned the same reference numerals as the members and parts corresponding to the airbag device 10 pertaining to the first embodiment, and description thereof will sometimes be omitted.

Figure 4:
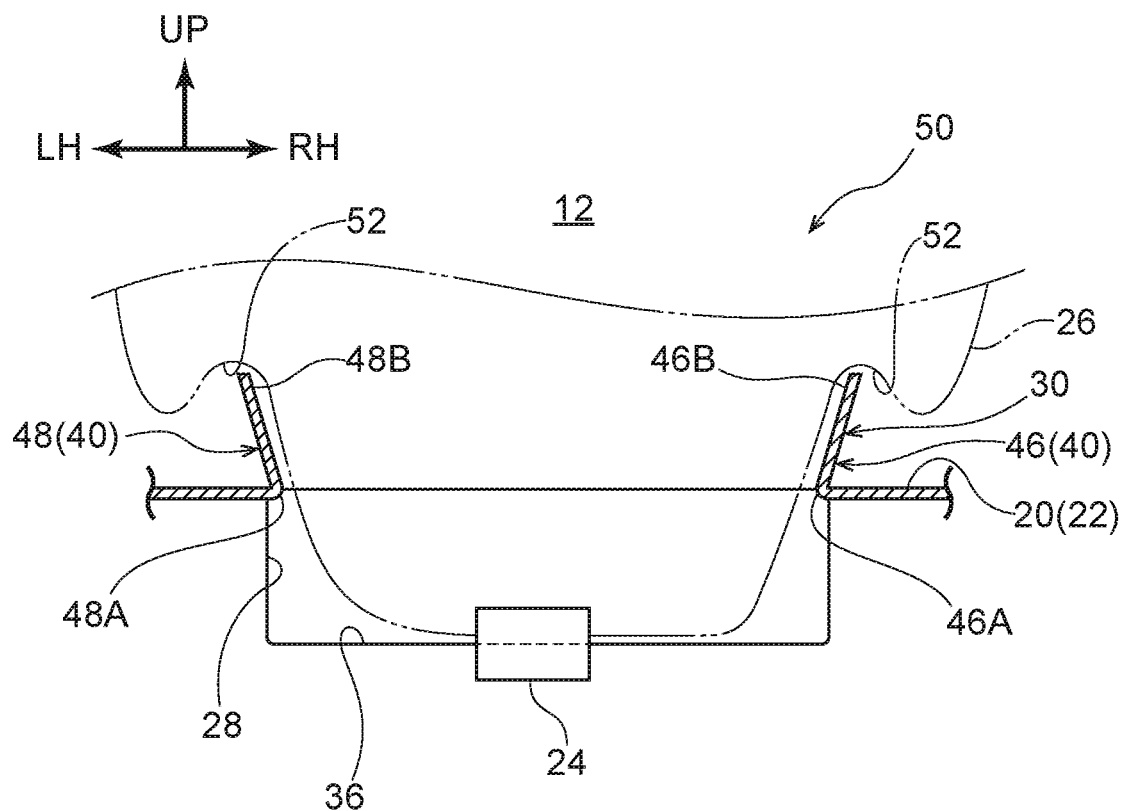
FIG. 4 is a sectional view, corresponding to FIG. 3, showing an airbag device pertaining to a second embodiment.

As shown in FIG. 4, the airbag device 50 of the present embodiment is characterized in that two recesses 52 are formed in the airbag door 30 side of the airbag 26 after complete deployment. Additionally, a part 46B of the right-side door portion 46 on the opposite side of the hinge portion 46A is disposed inside one recess 52. Furthermore, a part 48B of the left-side door portion 48 on the opposite side of the hinge portion 48A is disposed inside the other recess 52.

Figure 5:
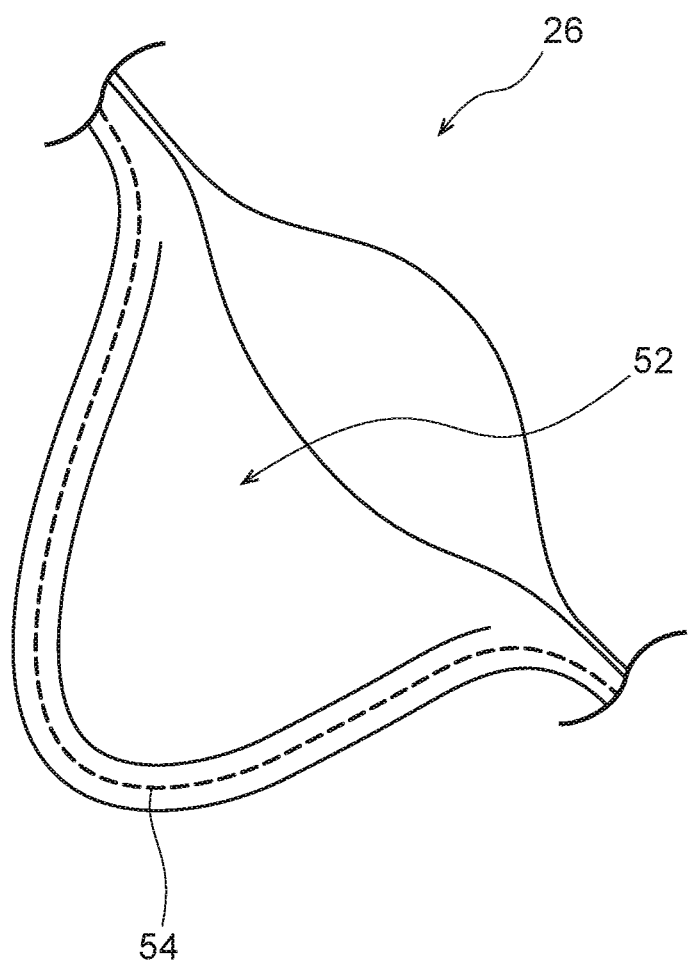
FIG. 5 is an enlarged view showing a part of the airbag where a-recess is formed.

Here, in the present embodiment, as shown in FIG. 5, the two recesses 52 are formed in the airbag 26 by lengthening the seam allowance of part of a seam 54 that forms the airbag 26 into a bag or adjusts the shape of the airbag 26. Specifically, the airbag 26 is equipped with plural (e.g., two) cloth-like members cut into predetermined shapes and a seam 54 at which the outer peripheral edge portions of the plural cloth-like members are sewn together. The two recesses 52 are formed in the airbag 26 by lengthening part of the seam 54 on the center side of the airbag 26 (the opposite side of the outer peripheral edge portions of the plural cloth-like members). The airbag 26 having the two recesses 52 may also be formed by seamlessly three-dimensionally weaving the cloth-like members.

In the present embodiment described above, in a state in which deployment of the airbag 26 is complete, the part 46B of the right-side door portion 46 on the opposite side of the hinge portion 46A and the part 48B of the left-side door portion 48 on the opposite side of the hinge portion 48A are disposed inside the two recesses 52 formed in the airbag 26. Because of this, parts of the airbag 26 become caught on the right-side door portion 46 and the left-side door portion 48, and movement of the airbag 26 in the vehicle width direction after complete deployment can be strongly regulated. Because of this, movement of the airbag 26 in the vehicle width direction after complete deployment can be effectively inhibited by the left-side door portion 48 and the right-side door portion 46.

Furthermore, in the present embodiment, by appropriately setting the configuration of the seam 54 (see FIG. 5), recesses 52 with shapes that more easily catch on the right-side door portion 46 and the left-side door portion 48 can be formed in the airbag 26.

Third Embodiment

An airbag device 56 pertaining to a third embodiment of the disclosure will be described using FIG. 6 and FIG. 7. Members and parts of the airbag device 56 pertaining to the third embodiment that correspond to those of the airbag device 10 pertaining to the first embodiment and so forth are assigned the same reference numerals as the members and parts corresponding to the airbag device 10 pertaining to the first embodiment and so forth, and description thereof will sometimes be omitted.

Figure 6:
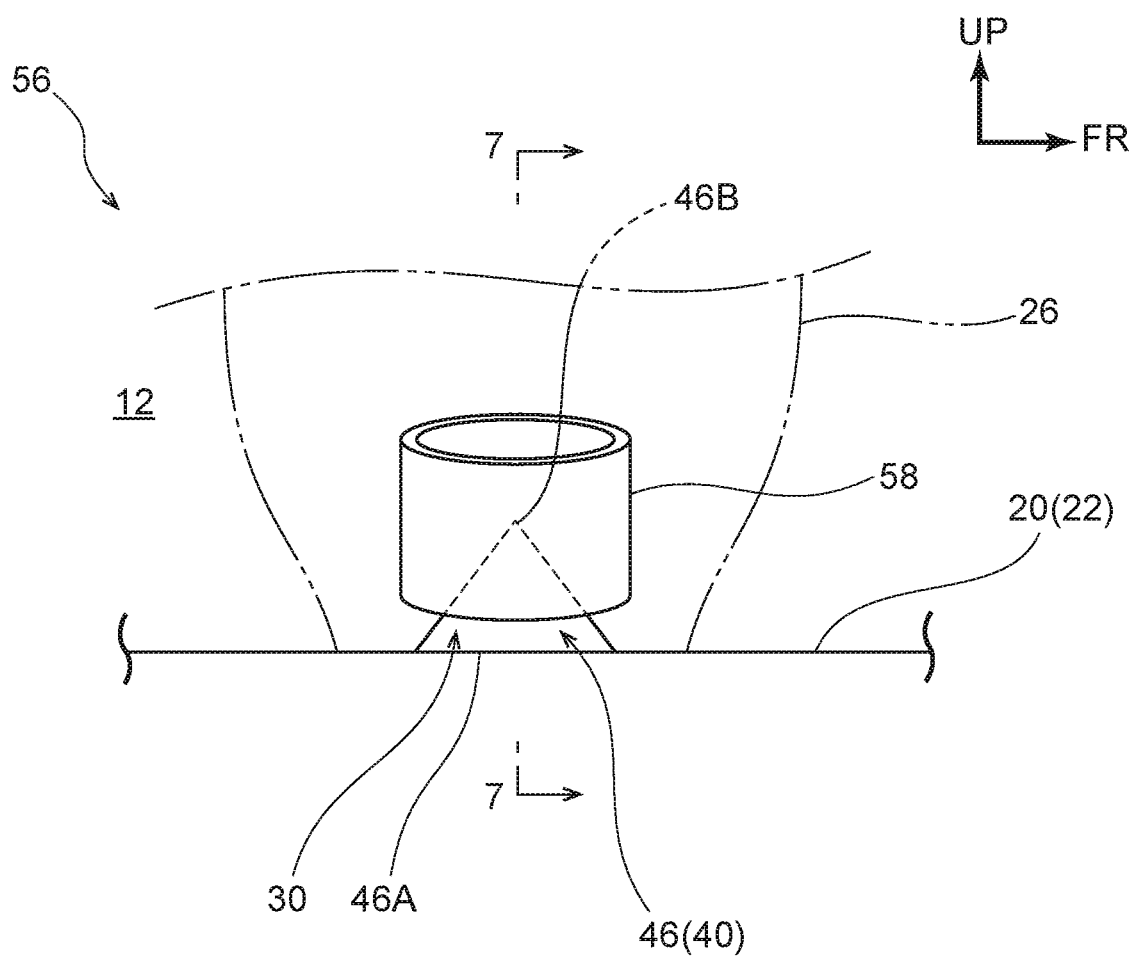
FIG. 6 is a side view showing an airbag device pertaining to a third embodiment, and shows an enlargement of a part where an engagement tube is provided.
Figure 7:
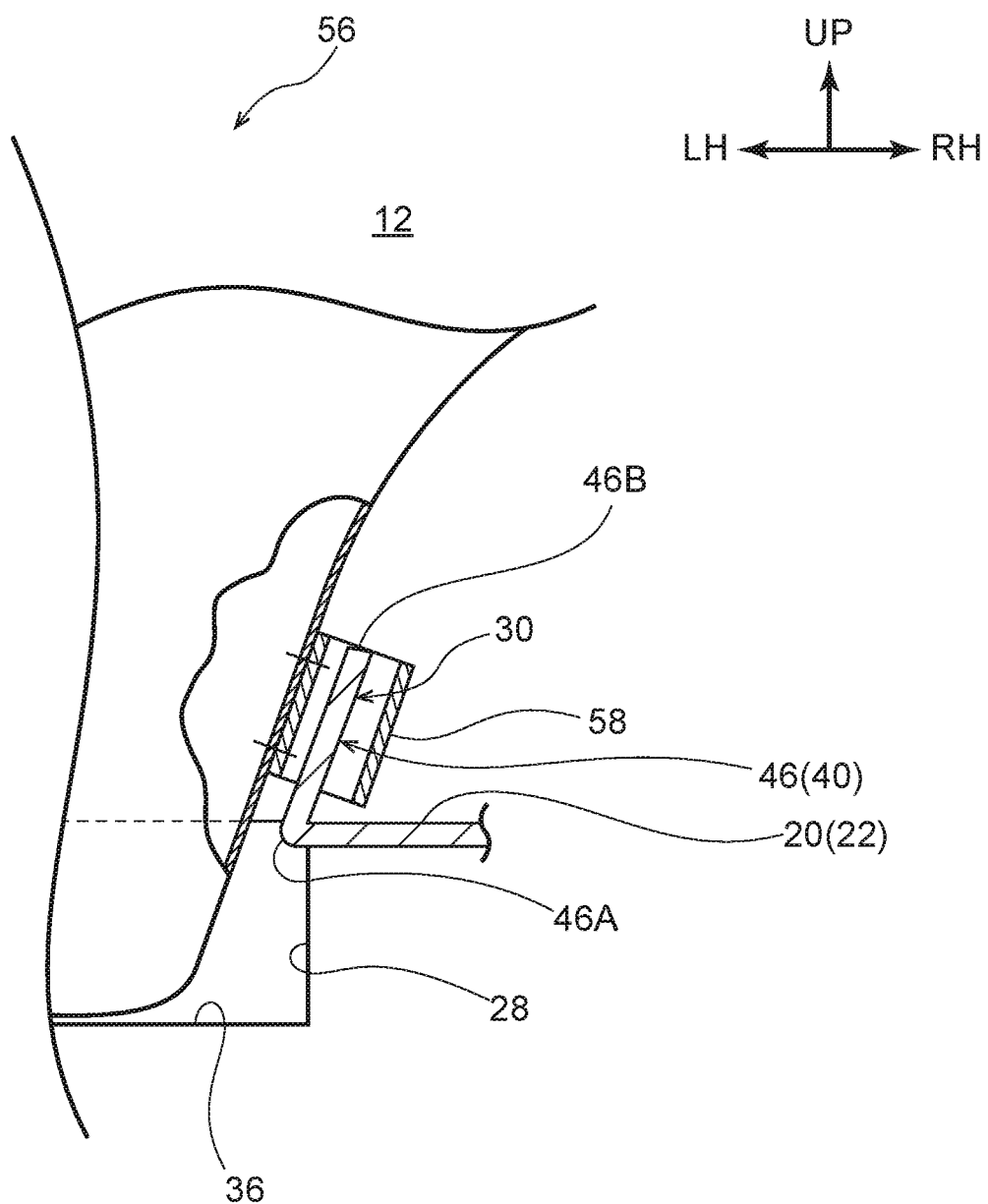
FIG. 7 is a sectional view showing the airbag device cut along line 7-7 shown in FIG. 6.

As shown in FIG. 6 and FIG. 7, the airbag device 56 of the present embodiment is characterized in that two engagement tubes 58 serving as engagement members are attached to the airbag door 30 side of the airbag 26 after complete deployment. Here, the engagement tubes 58 are attached to the airbag 26 by sewing, adhesion, or welding, for example. Additionally, the part 46B of the right-side door portion 46 on the opposite side of the hinge portion 46A is disposed inside one engagement tube 58. Furthermore, the part 48B of the left-side door portion 48 on the opposite side of the hinge portion 48A is disposed inside the other engagement tube 58. FIG. 6 and FIG. 7 show the right-side door portion 46 and the engagement tube 58 inside of which is disposed the right-side door portion 46.

In the present embodiment described above, in a state in which deployment of the airbag 26 is complete, the part 46B of the right-side door portion 46 on the opposite side of the hinge portion 46A and the part 48B of the left-side door portion 48 on the opposite side of the hinge portion 48A are disposed inside the two engagement tubes 58 attached to the airbag 26. Because of this, parts of the airbag 26 become caught, via the engagement tubes 58, on the right-side door portion 46 and the left-side door portion 48, and movement of the airbag 26 in the vehicle width direction after complete deployment can be strongly regulated. Because of this, movement of the airbag 26 in the vehicle width direction after complete deployment can be effectively inhibited.

Fourth Embodiment

An airbag device 60 pertaining to a fourth embodiment of the disclosure will be described using FIG. 8. Members and parts of the airbag device 60 pertaining to the fourth embodiment that correspond to those of the airbag device 10 pertaining to the first embodiment and so forth are assigned the same reference numerals as the members and parts corresponding to the airbag device 10 pertaining to the first embodiment and so forth, and description thereof will sometimes be omitted.

As shown in FIG. 8, the airbag device 60 pertaining to the present embodiment is characterized in that a single recess 52 is formed in the airbag door 30 side of the airbag 26 after complete deployment, and the rear-side door portion 44 located on the side near the front passenger seat 14 is disposed inside the recess 52.

In the present embodiment described above, in a state in which deployment of the airbag 26 is complete, the rear-side door portion 44 is disposed inside the recess 52 formed in the airbag 26. Because of this, part of the airbag 26 becomes caught on the rear-side door portion 44, and movement of the airbag 26 in the vehicle width direction after complete deployment can be strongly regulated. Because of this, movement of the airbag 26 in the vehicle width direction after complete deployment can be effectively inhibited by the rear-side door portion 44. In particular, part of the airbag 26 catches not on the front-side door portion 42 but on the rear-side door portion 44 located on the side near the front passenger seat 14, so when the head of the occupant seated in the front passenger seat 14 pushes the airbag 26 leftward or rightward, the airbag 26 can be effectively inhibited from moving leftward or rightward.

In the embodiments described above, examples were described where the configuration of the disclosure is applied to the airbag devices 10, 50, 56, 60 disposed on the front side of the front passenger seat 14, but the disclosure is not limited to this. For example, in an autonomous driving vehicle capable of traveling even without an occupant performing driving operations, the airbag device to which the configuration of the disclosure has been applied may also be provided on the front side of a vehicle seat provided in a position corresponding to the driver's seat 16 (see FIG. 1) described in the embodiments.

Furthermore, the rigidities of the hinge portions (42A, 44A, 46A) may also be set so that it is more difficult for the left-side door portion 48 to tilt than it is for the other door portions 40 (42, 44, 46).

Furthermore, in the embodiments described above, a configuration having the center bag portion 34 (see FIG. 1) was described, but the application target of the disclosure is not limited to this. For example, the configuration of the disclosure may also be applied in order to limit movement, in the vehicle width direction, of an airbag not equipped with the center bag portion 34.

Furthermore, in the embodiments described above, examples were described where movement of the airbag 26 in the vehicle width direction is limited by the right-side door portion 46 and the left-side door portion 48 or the rear-side door portion 44 that configure parts of the airbag door 30, but the disclosure is not limited to this. For example, movement of the airbag 26 in the vehicle width direction may also be limited by the entire airbag door 30.

Embodiments of the disclosure have been described above, but the disclosure is not limited to what is described above and can of course be modified and implemented in a variety of ways, in addition to what is described above, in a range that does not depart from the spirit thereof.

What is claimed is:

1. An airbag device comprising:
   an airbag that is provided at a vehicle front side of a vehicle seat provided in a cabin, that inflates as a result of a gas being supplied to an interior of the airbag, and that deploys to a vehicle front side of an occupant seated in the vehicle seat;
   an airbag housing that is provided at the vehicle front side of the vehicle seat and in which the airbag is housed before inflating; and
   an airbag door that covers the airbag housing from a cabin side and that displaces toward the cabin side in a case in which the airbag inflates, whereby the airbag door opens the cabin side of the airbag housing,
   wherein movement of the airbag in a vehicle width direction after complete deployment is limited by at least part of the airbag door,
   wherein the airbag housing and the airbag door are mounted to an instrument panel of the vehicle cabin.

2. The airbag device according to claim 1, wherein the airbag is equipped with:
   a main body portion that is cuboidal in shape in a completely deployed state; and
   a center bag portion that projects rearward from a rear end portion, at a vehicle width direction center side, of the main body portion.

3. The airbag device according to claim 1, wherein:
   the airbag door includes plural door portions that tilt about hinge portions at parts of the airbag housing along an open end of the airbag housing,
   the rigidities of the hinge portions make it more difficult for the door portions that tilt about the hinge portions at vehicle width direction end portions of the airbag housing to tilt, than for the door portions that tilt about the hinge portions at a vehicle front side and a vehicle rear side of the airbag housing to tilt, and
   movement of the airbag in the vehicle width direction after complete deployment is limited by the door portions that tilt about the hinge portions at the vehicle width direction end portions of the airbag housing.

4. The airbag device according to claim 3, wherein the rigidities of the hinge portions make it more difficult for a door portion that tilts about the hinge portion at a vehicle width direction inner side of the airbag housing to tilt, than for a door portion that tilts about the hinge portion at a vehicle width direction outer side of the airbag housing to tilt.

5. The airbag device according to claim 1, wherein:
   the airbag door includes plural door portions that tilt about hinge portions at parts of the airbag housing along an open end of the airbag housing, and
   movement of the airbag in the vehicle width direction after complete deployment is limited by the door portion that tilts about a hinge portion at a vehicle rear side of the airbag housing.

6. The airbag device according to claim 1, wherein a recess, by which movement of the airbag in the vehicle width direction after complete deployment is limited as a result of part of the airbag door becoming disposed inside the recess, is formed in the airbag after complete deployment.

7. The airbag device according to claim 6, wherein the airbag includes a seam that forms the recess.

8. The airbag device according to claim 1, wherein an engagement member, by which movement of the airbag in the vehicle width direction after complete deployment is limited as a result of part of the airbag door becoming engaged with the engagement member, is attached to the airbag.

9. An airbag device comprising:
   an airbag that is provided at a vehicle front side of a vehicle seat provided in a cabin, that inflates as a result of a gas being supplied to an interior of the airbag, and that deploys to a vehicle front side of an occupant seated in the vehicle seat;
   an airbag housing that is provided at the vehicle front side of the vehicle seat and in which the airbag is housed before inflating; and an airbag door that covers the airbag housing from a cabin side and that displaces toward the cabin side in a case in which the airbag inflates, whereby the airbag door opens the cabin side of the airbag housing, wherein movement of the airbag in a vehicle width direction after complete deployment is limited by at least part of the airbag door, wherein the airbag is equipped with:

a main body portion that is cuboidal in shape in a completely deployed state; and a center bag portion that projects rearward from a rear end portion, at a vehicle width direction center side, of the main body portion.

10. The airbag device according to claim 9, wherein:

the airbag door includes plural door portions that tilt about hinge portions at parts of the airbag housing along an open end of the airbag housing, the rigidities of the hinge portions make it more difficult for the door portions that tilt about the hinge portions at vehicle width direction end portions of the airbag housing to tilt, than for the door portions that tilt about the hinge portions at a vehicle front side and a vehicle rear side of the airbag housing to tilt, and movement of the airbag in the vehicle width direction after complete deployment is limited by the door portions that tilt about the hinge portions at the vehicle width direction end portions of the airbag housing.

11. The airbag device according to claim 10, wherein the rigidities of the hinge portions make it more difficult for a door portion that tilts about the hinge portion at a vehicle width direction inner side of the airbag housing to tilt, than for a door portion that tilts about the hinge portion at a vehicle width direction outer side of the airbag housing to tilt.

12. The airbag device according to claim 9, wherein:

the airbag door includes plural door portions that tilt about hinge portions at parts of the airbag housing along an open end of the airbag housing, and movement of the airbag in the vehicle width direction after complete deployment is limited by the door portion that tilts about a hinge portion at a vehicle rear side of the airbag housing.

13. The airbag device according to claim 9, wherein a recess, by which movement of the airbag in the vehicle width direction after complete deployment is limited as a result of part of the airbag door becoming disposed inside the recess, is formed in the airbag after complete deployment.

14. The airbag device according to claim 13, wherein the airbag includes a seam that forms the recess.

15. The airbag device according to claim 9, wherein an engagement member, by which movement of the airbag in the vehicle width direction after complete deployment is limited as a result of part of the airbag door becoming engaged with the engagement member, is attached to the airbag.

16. An airbag device comprising:

an airbag that is provided at a vehicle front side of a vehicle seat provided in a cabin, that inflates as a result of a gas being supplied to an interior of the airbag, and that deploys to a vehicle front side of an occupant seated in the vehicle seat;

an airbag housing that is provided at the vehicle front side of the vehicle seat and in which the airbag is housed before inflating; and an airbag door that covers the airbag housing from a cabin side and that displaces toward the cabin side in a case in which the airbag inflates, whereby the airbag door opens the cabin side of the airbag housing, wherein movement of the airbag in a vehicle width direction after complete deployment is limited by at least part of the airbag door, wherein:

the airbag door includes plural door portions that tilt about hinge portions at parts of the airbag housing along an open end of the airbag housing, the rigidities of the hinge portions make it more difficult for the door portions that tilt about the hinge portions at vehicle width direction end portions of the airbag housing to tilt, than for the door portions that tilt about the hinge portions at a vehicle front side and a vehicle rear side of the airbag housing to tilt, and movement of the airbag in the vehicle width direction after complete deployment is limited by the door portions that tilt about the hinge portions at the vehicle width direction end portions of the airbag housing.

17. The airbag device according to claim 16, wherein the rigidities of the hinge portions make it more difficult for a door portion that tilts about the hinge portion at a vehicle width direction inner side of the airbag housing to tilt, than for a door portion that tilts about the hinge portion at a vehicle width direction outer side of the airbag housing to tilt.

18. The airbag device according to claim 16, wherein:

the airbag door includes plural door portions that tilt about hinge portions at parts of the airbag housing along an open end of the airbag housing, and movement of the airbag in the vehicle width direction after complete deployment is limited by the door portion that tilts about a hinge portion at a vehicle rear side of the airbag housing.

19. The airbag device according to claim 16, wherein a recess, by which movement of the airbag in the vehicle width direction after complete deployment is limited as a result of part of the airbag door becoming disposed inside the recess, is formed in the airbag after complete deployment.

20. The airbag device according to claim 16, wherein an engagement member, by which movement of the airbag in the vehicle width direction after complete deployment is limited as a result of part of the airbag door becoming engaged with the engagement member, is attached to the airbag.

* * * * *